United States Patent [19]

Layman

[11] 3,893,959

[45] July 8, 1975

[54] ALKYL RESIN CONTAINING AN OLIGOMER MIXTURE OF UNSATURATED LONG CHAIN FATTY ACIDS

[75] Inventor: Ralph Earl Layman, Stamford, Conn.

[73] Assignee: American Cyanamid Company, Stamford, Conn.

[22] Filed: Sept. 5, 1974

[21] Appl. No.: 503,218

Related U.S. Application Data

[63] Continuation-in-part of Ser. No. 409,223, Oct. 24, 1973, abandoned.

[52] U.S. Cl...... 260/22 D; 117/132 BF; 117/132 B; 117/161 K; 260/21; 260/22 CQ; 260/29.2 E
[51] Int. Cl........................... C09d 3/64; C09d 5/02
[58] Field of Search........................... 260/22 D

[56] References Cited
UNITED STATES PATENTS

| | | | |
|---|---|---|---|
| 3,158,584 | 11/1964 | Layman | 260/22 D |
| 3,235,520 | 2/1966 | Crowell | 260/22 D |
| 3,278,636 | 10/1966 | Wynstra | 260/22 D |
| 3,367,894 | 2/1968 | Bruggeman | 260/22 D |
| 3,383,343 | 5/1968 | Mohajer et al. | 260/22 D |
| 3,498,940 | 3/1970 | Laganis | 260/22 D |
| 3,530,082 | 9/1970 | O'Gorman et al. | 260/22 D |
| 3,674,727 | 7/1972 | Fekete et al. | 260/22 D |
| 3,719,620 | 3/1973 | Layman | 260/22 D |
| 3,763,064 | 10/1973 | Soliday | 260/22 D |
| R27,279 | 1/1972 | Layman | 260/22 D |

OTHER PUBLICATIONS

Boylan, Dimerized Acids and Their use in Coil Coatings, Presented at the North Dakota State University Eighth Annual Symposium on New Coatings and New Coatings Raw Materials, May 30, 1966, pp. 1–26.

*Primary Examiner*—Ronald W. Griffin
*Attorney, Agent, or Firm*—James T. Dunn

[57] ABSTRACT

This invention relates to an alkyd resin comprising the esterification reaction product of certain aromatic dicarboxylic acids, certain aromatic tricarboxylic acids and an oligomer mixture of unsaturated long chain fatty acids esterified with at least one hindered diol free of any carboxyl groups with or without a hindered diol compound containing a tertiary carboxyl group and/or at least one unhindered diol or at least one polyhydric alcohol having at least 3 alcoholic hydroxy groups.

10 Claims, No Drawings

3,893,959

ALKYL RESIN CONTAINING AN OLIGOMER MIXTURE OF UNSATURATED LONG CHAIN FATTY ACIDS

CROSS REFERENCE TO RELATED APPLICATIONS

This application is a continuation-in-part of my earlier application Ser. No. 409,223 filed Oct. 24, 1973, now abandoned.

BACKGROUND OF THE INVENTION

Alkyd resins have been prepared and manufactured and sold for a plurality of years. These alkyd resins, sometimes referred to as polyester resins, are prepared by reacting a polycarboxylic acid with a polyhydric alcohol with or without an oil modifier such as the glyceride oils or the fatty acids derived therefrom. More particularly these alkyd resins are generally prepared by reacting a phthalic acid and a polyhydric alcohol with or without additional modifiers and the ultimate alkyd resin is useful primarily in coating compositions wherein an organic solvent is used as the solvent medium. These improved alkyd resins display improved properties in flexibility, toughness and elasticity. Certain of these alkyd resins display good emulsion characteristics and can be dispersed in water to form an oil in water emulsion.

FIELD OF THE INVENTION

The present invention is in the field of alkyd resins prepared by reacting at least one aromatic dicarboxylic acid, and at least one aromatic tricarboxylic acid and an oligomer mixture of unsaturated long chain fatty acids with or without at least one aliphatic dicarboxylic acid esterified by one hindered diol free of any carboxyl groups with or without at least one hindered diol compound containing a tertiary carboxyl group and with or without at least one unhindered diol or at least one polyhydric alcohol having at least 3 alcoholic hydroxy groups which polyhydric alcohol may or may not be hindered.

DESCRIPTION OF THE PRIOR ART

The references with which the instant applicant is familiar which are deemed to be the most closely related art are his U.S. Letter Pat. No. 3,158,584 and the reissue of said patent, namely RE No. 27,279, and his U.S. Pat. No. 3,719,620. The instant applicant is also aware of the U.S. Pat. No. 3,235,520 and the U.S. Pat. No. 3,530,082. All of these U.S. patents are incorporated herein by reference.

SUMMARY OF THE INVENTION

This invention relates to an alkyd resin comprising the esterification reaction product of (a) a mixture of (1) from about 40 percent to about 82 percent of at least one aromatic dicarboxylic acid; (2) from about 5 to 20 percent of at least one aromatic tricarboxylic acid; (3) from about 10 to 20 percent of an oligomer mixture of unsaturated long chain fatty acid; and (4) from about 0 to 20 percent of at least one aliphatic dicarboxylic acid, wherein said percentages of acids are by weight and are based on the total weight of said acids used and the total percentages amount to 100 percent, and (b) a mixture of (1) from about 90 to 50 percent of at least one hindered diol free of any carboxyl groups; (2) from about 0% to 25% of at least one hindered diol compound containing a tertiary carboxy group; and/or (3) from about 0% to 25 percent of at least one unhindered diol and/or at least one polyhydric alcohol having at least 3 alcoholic hydroxyl groups and which polyhydric alcohol may be hindered or unhindered, wherein said percentages of diols and polyhydric alcohols are percentages by weight based on the total weight of the alcohol component used and total 100 percent.

In the preparation of the alkyd resin compositions of the present invention, one will make use of at least one aromatic dicarboxylic acid of which the principal ones known are in the phthalic acid family. Among the phthalic acids which may be used in the practice of the process of the present invention are: phthalic acid per se; isophthalic acid; terephthalic acid; endomethylene tetrahydrophthalic acid; naphthalic acid 1,4; naphthalic acid 1,8; naphthalene 1,2 dicarboxylic acid; naphthalene-2,3 dicarboxylic acid, naphthalic anhydride 1,8; and the halo substituted phthalic acids such as hexachlorophthalic acid and the like. Wherever available, the anhydrides of these acids may be used. These acids and/or their anhydrides may be used either singly or in combination with one another. The amount of the aromatic dicarboxylic acid or acids or mixture of acids and/or anhydrides which may be used in the formulation of the alkyd resins of the present invention may be varied between about 40 percent to about 82 percent, by weight, based on the total weight of the acid components used in the alkyd resin formulation. It is preferred to use between about 55 percent and 70 percent, by weight, of the aromatic dicarboxylic acid same basis. Among the aromatic dicarboxylic acids used in the formulation of the alkyd resins of the present invention, isophthalic acid is preferred.

The second essential ingredient used in the composition of the present invention is an aromatic tricarboxylic acid. Among the aromatic tricarboxylic acids which may be used in the formulations of the alkyd resins of the present invention are hemimellitic acid, (benzene tricarboxylic acid 1,2,3); trimellitic acid, (benzene tricarboxylic acid 1,2,4); trimesic acid (benzene tricarboxylic acid 1,3,5) naphthalene tricarboxylic acid 1,2,3; naphthalene tricarboxylic acid 1,2,4; naphthalene tricarboxylic acid 1,4,5; and the like. Wherever available the anhydrides of these aromatic tricarboxylic acids may be used and are preferred. These acids and/or their anhydrides may be used either singly or in combination with one another. The amount of the aromatic tricarboxylic acid used in the alkyd resins of the present invention may be varied between about 5 percent to about 20 percent, by weight, based on the total weight of the acids used in the formulation. It is preferred to use between 7 percent and 12 percent, by weight, of the aromatic tricarboxylic acid, same basis.

The third essential component used in the composition of the present invention is an oligomer mixture of unsaturated long chain fatty acids. These oligomer mixtures may contain one or more dimers of an unsaturated aliphatic monocarboxylic acid having between about 14 and 22 carbon atoms. These dimer acid compositions or mixtures are well known in the art and a plurality of these dimer compositions are available commercially. It will be apparent that these dimer acids compositions are predominately polycarboxylic acids. These dimer acids are derived by conventional procedures by dimerizing such aliphatic monocarboxylic acids as myristoleic, palmitoleic, oleic, linoelic, linolenic, elaeosteric, licanic, erucic, and the like. In addition one can use a significant amount of fatty acids in the form of blends or mixtures of complex polymers (oligomers) of oleic and linoleic acid. Certain of these mixtures have and still are referred to as "dimer acids" because they have been marketed at high contents of the dimers such as 75–95 percent dimer, 24–4 percent of trimer and about 1 percent of monomer. However, other less refined mixtures are also very useful such as those containing 46 percent trimer, 28 percent tetramer, 11.5 percent dimer and 13.5 percent monomer. Another suitable mixture is one containing 80% trimer and the balance largely dimer with a trace of monomer. The principal virtues of the high dimer content mixtures are better color and lower viscosity. Another oligomer composition that is available commercially contains about 70 percent of trimer acid, about 13 percent dimer acid and about 17 percent monomer acid, by weight, wherein said oligomers are derived from tall oil fatty acids which are primarily oleic and linoleic acids. The amount of the oligomer mixture of the unsaturated long chain fatty acids which may be used in the formulations of the alkyd resins of the present invention may be an amount varying between about 10 percent to about 20 percent, by weight, based on the total weight of the acids used in the formulation. It is preferred to use between about 12 percent and 17 percent, by weight, of the oligomer mixture, same basis.

The fourth component in the specific mixture is not an essential reactant but is preferably used and is identified as an aliphatic dicarboxylic acid and preferably an aliphatic dicarboxylic acid free of any $\alpha$-$\beta$-ethylenic unsaturation. Since this component can be left out, one may use none of the aliphatic dicarboxylic acid. On the other hand, one may use up to about 20 percent, by weight, of this aliphatic dicarboxylic acid based on the total weight of the acids used. Whether there are 3 different specific components or 4, the total percentages by weight of the acids used will be 100 percent. Among the simple aliphatic dicarboxylic acids which may be used are adipic, succinic, suberic, azelaic, sebacic, glutaric, malic, malonic, pimelic, tartaric, and the like. Wherever available the anhydrides of these acids may be used. These acids and/or their anhydrides may be used either singly or in combination with one another. The preferred amount of these aliphatic dicarboxylic acids which may be used can be varied between about 10 percent and 15 percent, by weight, same basis as above.

As far as the alcoholic component used in the esterification reaction to produce the alkyd resins of the present invention, only one class is considered to be essential and that is the hindered diols free of any carboxyl groups. Among the hindered diols free of any carboxyl groups which may be used in the preparation of the alkyd resins of the present invention are neopentyl glycol, (2,2-dimethyl propane diol 1,3); 2,2-diethylpropane diol-1,3; 2-ethyl, 2-methyl propane diol-1,3; 2-ethyl, 2-butyl propane diol-1,3; 2,2-diethyl, 1,3-hexane diol; 2,2,4-trimethyl 1,3-pentane diol; and the ester diol 2,2-dimethyl-3-hydroxypropyl 2,2-dimethyl-3-hydroxypropionate, and the like. These hindered diols free of any carboxyl groups may be used either singly or in combination with one another. They may be used in an amount varying between about 90 percent to about 50 percent, by weight, based on the total weight of the alcohol component used in the preparation of the alkyd resin of the present invention. It is preferred to use the hindered diols free of any carboxyl group in amount varying between about 65 percent and 80 percent, by weight, same basis.

The hindered diols containing a tertiary carboxyl group may be any one of the following compounds: 2,2-bis(hydroxymethyl) propionic acid, 2,2-bis(hydroxymethyl) butyric acid; 2,2-bis(hydroxymethyl) n-pentanoic; 2,2-bis(hydroxymethyl) n-hexanoic acid; 2,2-bis(hydroxymethyl) n-heptanoic acid; 2,2-bis(hydroxymethyl) n-octanoic acid; 2,2 bis(hydroxymethyl) n-pelargonic acid, 2,2-bis(hydroxymethyl) n-capric acid and the like. These hindered diols may be used either singly or in combination with one another. These hindered diols containing a tertiary carboxyl group may be omitted from the formulation altogether or may be used in an amount up to 25 percent, by weight, based on the total weight of the alcohols used to prepare the alkyd resins of the present invention. It is preferred to use between about 7 percent and 15 percent, by weight, of the hindered diol containing the tertiary carboxyl group, same basis.

If desired one can use additionally in the formulation a class of diols which are identified as unhindered diols. Among the unhindered diols which may be used in the formulations of the alkyd resin of the present invention are ethylene glycol, diethylene glycol, propylene glycol, Di(1,2 propylene) glycol, butane diol 1,4; butane diol 1,3; butane diol 2,3; pentane diol 1,5; hexane diol 1,6; heptane diol 1,7; octane diol 1,8; and the like. These diols may be used either singly or in combination with one another. These unhindered diols may be omitted from the formulation altogether or may be used in an amount of about 25 percent, by weight, based on the total weight of the alcohols used to produce the alkyd resin of the present invention. It is preferred to use between about 8 percent and 20 percent, by weight, of these unhindered diols, same basis.

In combination with the unhindered diols referred to hereinabove, one may use polyhydric alcohols that contain at least 3 alcoholic hydroxy groups whether they are hindered or unhindered. These polyhydric alcohols can be used in complete substitution for the unhindered diols or may be used in combination with them. Among the polyhydric alcohols that fit into this category are glycerol, trimethylol ethane, trimethylol propane, pentaerythritol, dipentaerythritol, sorbitol, mannitol, adonitol, 1,2,6 hexane triol and the like. These polyhydric alcohols, whether hindered or unhindered, may be used either singly or in combination with one another or may be used in combination with the hindered diols that contain the tertiary carboxyl group. These polyhydric alcohols may be omitted completely from the formulation or they may be used in amounts up to about 25 percent, by weight, based on the total weight of the alcohols used. It is preferred to use between about 8% and 20 percent, by weight, of the polyhydric alcohols that are either hindered or unhindered, same basis.

It should be noted that the maximum amount of the hindered diols free of any carboxyl groups which are mandatorily used in the composition of the present invention is about 90%, by weight, based on the total weight of the alcohols used. The hindered diols containing the tertiary carboxyl group or the unhindered diols or the polyhydric alcohols containing at least three alcoholic hydroxy groups must make up that additional minimum of 10% of diols or polyhydric alcohols other than the hindered diols that are free of any carboxyl groups. As a consequence, a hindered diol containing a tertiary carboxyl group must be present in an amount of at least 10%, by weight, based on the total weight of the alcohols used if there is no unhindered diol and no polyhydric alcohol used. On the other hand, if there is used no hindered diol containing a tertiary carboxyl group then one must use at least 10 percent, by weight, based on the total weight of the alcohols used of at least one unhindered diol or 10 percent, by weight, of at least one polyhydric alcohol having at least 3 alcoholic hydroxyl groups. As a consequence, whatever is contained in the mixture of those compounds containing alcoholic hydroxyl groups one must have a total of 100 percent of the various components in the mixture. When one uses only 50 percent, by weight, of at least one hindered diol free from any carboxyl groups, one must then use at least 15 percent, by weight, of at least one hindered diol containing a tertiary carboxyl group and at least 5 percent, by weight, of either at least one unhindered diol or at least 5 percent of one or more polyhydric alcohols having at least 3 alcoholic hydroxy groups whether hindered or unhindered.

In preparing the novel alkyd resin of the present invention, one may introduce the aromatic dicarboxylic acid and the polyhydric alcohol composition into a suitable reaction vessel and esterify the reactants in part prior to the addition of the mixture of oligomer of the unsaturated long chain fatty acids. Alternatively, one may introduce the oligomer mixture and the polyhydric alcohol composition and esterify these reactants in part with one another prior to the addition of the aromatic dicarboxylic acid component. Still further, one may introduce all of the acidic components (except the tricarboxylic aromatic acid) and the polyhydric alcohol components into the reaction vessel, namely the aromatic dicarboxylic acid, the mixture of oligomer with or without any aliphatic dicarboxylic acid together with the hindered diol free of any carboxyl groups, with or without the hindered diol containing a tertiary carboxyl group, with or without an unhindered diol or a polyhydric alcohol having at least 3 alcohol hydroxy groups and carry out the esterification reaction by heating the mixture with substantially constant agitation or stirring until an acid number of about 20 has been reached. The aromatic tricarboxylic acid is then added. The reaction should be continued until the esterification has proceeded sufficiently to produce a composition having an acid number of at least 20 and preferably at least 40 although acid numbers as high as 70–80 are useful. The preferred range of the acid number is between about 40 and 60. The acid number of this alkyd resin is derived from 3 sources (1) the unreacted carboxyls of the dicarboxylic acids, mainly the phthalic or isophthalic acid employed, (2) the tertiary carboxyl on the hindered glycol such as the 2,2-bis(hydroxymethyl)propionic acid and (3) largely from the aromatic tricarboxylic acid such as the trimellitic anhydride. This latter material is generally added to the polyester resin or alkyd resin just a short time before the end of the processing of the alkyd resin. In so doing, the anhydride ring reacts with an hydroxyl group of the alkyd molecules and thus terminates them with carboxyl groups.

In preparing the alkyd resins of the present invention one may use stoichiometrically calculated amounts of the hydroxyl and carboxyl components. Alternatively one may use an excess of the hydroxyl component amounting to as much as 25 percent over and beyond the stoichiometrically calculated amounts of the hydroxyl component required to esterify completely the calculated carboxyl component. It is preferred to use about 5 percent to about 10 percent excess of the hydroxyl component over the carboxyl component on a stoichiometrically calculated basis. For certain purposes, particularly where water dispersible alkyd resins are required, it may be desirable to use an excess of the carboxyl components amounting to as much as 25 percent in excess of the hydroxyl component, again on a stoichiometrically calculated basis. As before, it is preferred, in certain instances, to use about 5 percent to about 15 percent excess of the carboxyl component over the hydroxyl component on a stoichiometrically calculated basis.

The alkyd resins of the present invention are compositions of reacted materials which have been chemically reacted together to produce a resinous alkyd that is suitable for preparing industrial baking enamels. When organic or inorganic bases are added to the alkyd resin, it may be thinned with water. Esters and particularly polyesters in the presence of water sometimes have had a tendency to hydrolize back to the initial starting components. This hydrolysis is promoted by heat, high and low pH and by other catalytical materials. Paints which have hydrolyzed lose their useful properties. It is one object of the present invention, therefore, to make resinous products for use as paint vehicles which are sufficiently stable, namely that are resistant sufficiently to hydrolysis, that they have industrial utility. By the employment of the hindered polyols, the rate of hydrolysis can be kept to a minimum. However, since the hydrolysis cannot be totally prevented, hindered polyols alone are not the complete answer. I have discovered that a hindered glycol containing a tertiary carboxyl group improves further the stability of the alkyd resin in water. The exact mechanism by which this improvement is effected is not completely known but it may be speculated that it affords an anionic or solubilizing group to a molecular chain irrespective of whether the chain is terminated by a hydroxyl group, a carboxyl group or an alkyl group.

Since the alkyd resins of this invention are soluble in organic water immiscible solvents as well as water miscible organic solvents, the stability therein is also important for those applications which will first dissolve the polyester in said solvents. For example an equal part mixture of n-butanol and butoxy ethanol is a suitable solvent that is water miscible. It has been discovered that if the hindered diol free of any carboxyl group is present in the reaction mixture in a content of a polyol which exceeds about 90 percent of the total polyol content of the polyester, then the solution becomes cloudy due to crystallization. The balance of the polyol is, therefore, to be made up from a hindered diol containing a tertiary carboxyl group such as the 2,2-bis(hydroxymethyl)propionic acid totally or at least 50 percent of the balance of the polyol used. Because of the several ways in which a polyester resin may manifest instability, the relative amounts of the various components happens to be limited.

The alkyd resins of the present invention make excellent coating resins which may be used preferably in combination with aminoplast resins which will be discussed in greater detail hereinbelow or with nitrocellulose lacquers. When used with aminoplast resins, the novel alkyd resins of the present invention may be cut with an appropriate solvent such as inert organic solvent. Among the inert organic solvents which may be used as a solvent medium for the novel resins of the present invention are benzene, toluene, xylene or Solvesso No. 100 or No. 150, butanol, methylisobutylketone, butyl acetate and the like. The amount of the solvent utilized with the novel resins of the present invention is not critical and proportions conventionally used in the art may be observed depending on the ultimate mode of use of the coating composition of the present invention. These compositions may be applied by brushing, roller coating, spraying, knife coating, hot melt and the like. For certain applications, no diluting solvent medium is necessary such as in the case of hot-melt adhesives. Quite obviously, if one wants a clear coating, no additives such as dyes and pigments will be added. On the other hand, if one wishes a colored coating composition, the selected dye and/or pigment may be added according to choice in conventional quantities.

In the preparation of the alkyd resins of the present invention, one would heat the reactants to an elevated temperature such as between about 190°C. and 250°C. until the desired acid number has been reached as discussed hereinabove. Preferably one would utilize temperatures varying between about 215°C. and 235°C.

The alkyd resins of the present invention, when blended with aminoplast resins in certain proportions, produce coating compositions which are capable of producing films that possess a combination of properties not previously known in most coating compositions. These outstanding properties are to be noted particularly in the area of impact resistance and hardness. The impact resistance of the films produced by the blend of the alkyd resins of the present invention with aminoplast resins or resin forming compositions, particularly the polymethyl ethers of polymethylol melamines, is so surprisingly excellent that it is possible through the use of this novel coating composition to coat sheet steel with these coatings and upon drying, such as by baking, the coated steel sheet can then be fabricated into many desired contours without any display of cracking or peeling which would normally be experienced even with other conventional commercially available alkyd coating compositions currently on the market. This outstandingly advantageous property would permit (1) the coating of metal sheets such as sheet steel to be utilized in the manufacture of household appliances such as refrigerators, stoves, washing machines and the like and (2) the postforming of the coated sheet to the desired shape and configuration. Still further, the coating compositions of the present invention could be utilized in metal sheets that are to be fabricated into automotive body parts such as fenders, hoods and the like. Additionally, a further advantage associated with the compositions of the present invention resides in the fact that an automotive body part, coated with the alkydamino resin composition of the present invention could experience accidental denting without displaying cracking or peeling of the coating on the metal. When such a dent were to be suffered, on an automotive body part, such as a fender, the same could be hammered out to substantially original form without need for a recoating except possibly in extreme cases when the damage was so great as to render such an approach not possible.

The aminoplast resins used with the alkyd resins of the present invention are well known in the art as is the term used to identify them. Among the aminoplast resins which may be utilized in combination with the novel alkyd resins of the present invention are those resinous materials prepared by reacting an aldehyde such as formaldehyde with a compound such as urea, thiourea, dicyandiamide or the amonotriazines such as melamine, benzoguanamine, acetoguanamine, formoguanamine, and the like. The mol ratios of the aldehyde to the amino compound are all well known in the art depending on the particular amine selected and it is not deemed necessary therefore to elaborate further on details that are well known in the art. These amine-aldehyde resins or potentially resin forming materials may be alkylated or unalkylated. The alkylated aminoplast resins are those which have been reacted with a monohydric aliphatic alcohol such as methanol, ethanol, propanol, butanol and the like. The degree of alkylation may also be varied significantly as is well known in the art and further elaboration of this concept is also deemed to be unnecessary. The preferred aminoplast materials used in the composition of the present invention are the polymethyl ethers of polymethylol melamines including the dimethyl ether of dimethylol melamine, tetramethyl ether of tetramethylol melamine and particularly preferred is the hexamethyl ether of hexamethylol melamine. It should be noted that these polymethyl ethers of polymethylol melamine may be resinous or nonresinous as used in the coating compositions of the present invention. If these materials are nonresinous no significant condensation has taken place and therefore these materials are in a sense monomeric in form but are unquestionably potentially resin forming materials, i.e., these materials are capable of being converted into resinous materials upon use such as heat, i.e., baking. The amount of aminoplast material used in the composition of the present invention may be varied to some extent but not over a very substantial range. The amount of aminoplast material should be limited within the range of about 5 to 50 percent, by weight, based on the total weight of aminoplast material and alkyd resin. preferably, the aminoplast material should be varied between about 15 percent and 25 percent, by weight, based on the total weight of the aminoplast material and the alkyd resin. The compositions of the present invention can be modified further by the addition to the alkyd resin-aminoplast composition, varying proportions of nitrocellulos lacquers, epoxy resins, polyvinyl chloride resins and the like.

In order that the concept of the present invention may be more completely understood, the following examples are set forth in which all parts are parts by weight unless otherwise indicated. These examples are set forth primarily for the purpose of illustration and any specific enumeration of detail contained therein should be interpreted as a limitation on the case except as is indicated in the appended claims.

EXAMPLE 1

Into a suitable reaction vessel equipped with an agitator, thermometer, inert gas inlet tube, and partial condenser, there is charged 930 parts of neopentyl glycol, 56 parts of trimethylol propane, 74 parts of dimethylol propionic acid, 303 parts of adipic acid, 240 parts of a mixture of oligomers containing about 70 percent of trimer acid, about 13 percent dimer acid and about 17 percent monomer acid, by weight, wherein said oligomers are derived from tall oil fatty acids which are primarily oleic and linoleic acids and 1087 parts of isophthalic acid. These reactants are heated under a blanket of nitrogen to a reaction temperature of about 165°–190°C. while the water of esterification is continuously removed with constant agitation. The heating is then increased and the temperature slowly rises to about 230°C. as the isophthalic acid reacts. When the reaction mass is clear, the acid number is about 20-25, the temperature is quickly lowered to about 190°C. and 64 grams of trimellitic anhydride are added. After holding the reaction mass for an additional 30 minutes at 185°C. the acid number is 44. The resin is then poured into a pot and cut to 75 percent resin solids content using n-butanol and n-butoxy ethanol.

EXAMPLE 2

Example 1 is repeated in all essential details except that the amount of neopentyl glycol used is 866 parts and dipropylene glycol amounting to 74 parts is used to make up for the reduced amount of neopentyl glycol. The processing is similar and the final acid number is 44. This resin is also cut in the same mix solvent and has a viscosity of $Z_6$-$Z_7$ on the Gardner-Holdt scale at 25°C.

EXAMPLE 3

Into a suitable reaction vessel equipped as in Example 1 there is introduced 910 parts of neopentyl glycol, 59 parts of trimethylol propane, 87 parts of dimethylol propionic acid, 1,038 parts of isophthalic acid, 330 parts of adipic acid and 240 parts of the same mixture of oligomers of unsaturated long chain fatty acids used in Example 1. The reactants are heated as in Example 1 until an acid number of 25 is reached, whereupon the resin is then cooled to about 190°C. and 102 parts of trimellitic anhydride are added. After one additional hour at 185°C. the resin has an acid number of 43. The resin is cooled to about 160°C. and is cut with a mixture of equal parts of n-butanol and n-butoxy ethanol to a resin solids content of about 75 percent.

The oligomer composition used in Examples 1 to 5 is principally a trimer acid composition comprising polymers of unsaturated aliphatic monocarboxylic acids having between 14 and 22 carbon atoms derived from tall oil fatty acids which are primarily oleic and linoleic acid. These acid compositions are known in the art and are commercially available. The trimer acid per se in the trimer acid composition is present in prepondent amounts such as about 70 percent, by weight, while the dimer content is about 13 percent and about 17 percent monomeric acid wherein the percentages total 100 percent. By using a mixture of commercial products, a great variety of compositions is possible.

COMPARATIVE EXAMPLE 4

Into a suitable reaction vessel equipped as in Example 1, there is introduced 763 parts of propylene glycol, 72 parts of trimethylol propane, 1,180 parts of isophthalic acid and 265 parts of the same mixture of oligomers of fatty acids as was used in Example 1. The charge is heated gradually to 235°C. under a blanket of nitrogen gas. When an acid number of 20 is reached the reaction vessel contents are cooled to about 200°C., whereupon 331 parts of adipic acid are added. The temperature is held at 200°C. until an acid number of 42 to 45 is reached. The temperature is then reduced to 160°C. and the resin is then cut with butoxy ethanol and n-butanol to a solids content of 75 percent. The viscosity, on the Gardner-Holdt scale at 25°C. is $Z_2$ to $Z_3$.

EXAMPLE 5

Into a suitable reaction vessel equipped as in Example 1, there is introduced 930 parts of neopentyl glycol, 105 parts of trimethylol propane, 330 parts of adipic acid, 240 parts of the same mixture of oligomers of fatty acids as was used in Example 1, 1,040 parts of isophthalic acid and 102 parts of trimellitic anhydride. These materials are processed to a resin according to the process set forth in Example 1, except that the final acid number is 40. When cut to a 75 percent solids solution by the use of equal weights of butoxy ethanol and n-butanol, the viscosity on the Gardner-holdt scale at 25°C. is $Z_4$.

COMPARATIVE EXAMPLE 6

Into a suitable reaction vessel equipped as in Example 1, there is introduced 517 parts of 1,2-propylene glycol, 97 parts of trimethylol propane and 696 parts of isophthalic acid. The charge is heated in the manner of Example 1, until an acid number of 25 is reached. The temperature is reduced from 220°C. to 175°C. and 438 parts of adipic acid are added. The temperature is raised to 190°C. in order to react the adipic acid. After 2 hours, when the acid number is 44, the temperature is reduced to 155°C. and the resin is cut to a 75 percent solids solution by using a 50/50 mixture of butoxy ethanol and n-butanol. The viscosity on the Gardner-Holdt scale at 25°C. is $Z_2$ to $Z_3$.

Baking enamels are prepared from the resins of Examples 1 to 6, inclusive, by adding to each of these resins a sufficient amount of hexakis (methoxymethyl) melamine so as to provide an 80/20, alkyd/melamine compound ratio on a solids basis. Titanium dioxide is next dispersed into each mixture using a ratio of 80/100, pigments/resin ratio, on a solids basis. The catalyst system, p-toluene sulfonic acid, is added as a 20 percent alcoholic solution, in an amount sufficient to provide 1 percent of catalyst by weight based on the total resin solids. Each enamel is then thinned to a 43% total solids solution, using water and dimethylethanolamine such that the final pH is 8.5. Films having a thickness of 3 mils are drawn down on chromate treated steel and the panels are baked for 20 minutes at 350°F. The panels were examined and tested and the films yielded the results set forth in Table I as under:

TABLE I

|  | Ex. 1 | 2 | 3 | 4 | 5 | 6 |
| --- | --- | --- | --- | --- | --- | --- |
| Appearance | good | good | good | cratered | good | cratered |
| Gloss 60° | 93 | 89 | 88 | 93 | 87 | 86 |
| Color | good | good | good | good | good | good |

TABLE 1—Continued

|  | Ex. 1 | 2 | 3 | 4 | 5 | 6 |
|---|---|---|---|---|---|---|
| Sward Hardness | 44 | 46 | 52 | 42 | 52 | 36 |
| Reverse Impact* | 130 | 140 | 140 | 90 | 140 | 80 |
| Adhesion | good | good | good | good | good | good |

*Reverse Impact values stated in inch lbs.

Samples of each resin solution were neutralized with dimethylethanolamine and reduced further with water to a 40 percent solids solution. The pH was again adjusted to 8.3 and these samples of each resin, in closed glass jars, were stored in an oven set at 130°F. in order to test hydrolytic stability. Frequent examinations disclosed the time for each solution to separate into two phases. When this occurred, the pH was always below 7 and usually at 6.6. The various examples had the following 130°F. stability:

TABLE II

| Ex. 1 | 28 days | Ex. 4 | 5 days |
|---|---|---|---|
| Ex. 2 | 20 days | Ex. 5 | 10 days |
| Ex. 3 | 25 days | Ex. 6 | 4 days |

Aliquots of each of the baking enamels were stored for one week in an oven held at 130°F. Upon removal from the oven, those coating compositions made from Examples 1, 2 3 and 5 showed only a slight fall-off in hardness, while gloss, viscosity, impact resistance and solvent resistance remained at least as good as before the oven storage. On the other hand, those enamels made from the resins of Examples 4 and 6 had separated into two phases and could not be stirred up into homogenous specimens again. The above mentioned behavior of the enamels at 130°F. storage illustrates clearly the superiority of the hindered glycols toward hydrolysis.

EXAMPLE 7

Into a suitable reaction vessel equipped as in Example 1 there is introduced 540 parts of neopentyl glycol, 540 parts of 2,2,4-trimethyl pentane diol-1-3, 60 parts of trimethylol propane, 87 parts of dimethylol propionic acid, 240 parts of the same mixture of oligomers of fatty acids as was used in Example 1, 1050 parts of isophthalic acid, and 330 parts of adipic acid.

The processing of these reactants is substantially the same as in Example 1. When the acid number reaches 20-25 and the product is clear, in contrast to turbid, the resinous mass is cooled to 190°C. and thereupon 100 parts of trimellitic anhydride are added. The temperature is then maintained at 185°C. until the acid number reaches 45 ± 2. The resin is then cooled and cut with the solvent as in Example 1, yielding a viscosity of $Z_5$ on the Gardener-Holdt scale at 25°C., and a solids of 75 percent. This resin was made into a baking enamel as was done with the resins of Examples 1-6 inclusive, and performed in all essential respects in a manner equal to Examples 1, 2 and 3.

EXAMPLE 8

Into a suitable reaction vessel equipped as in Example 1 there is introduced 800 parts of neopentyl glycol, 55 parts of trimethylol propane, 75 parts of dimethylol propionic acid, 160 parts of 2-ethyl-1, 3-hexane diol, 280 parts of adipic acid, 1,080 parts isophthalic acid and 280 parts of an oligomer mixture derived from soybean oil fatty acids, having the average composition of about 85 percent dimer acids, about 13.8 percent of trimer acids, and about 1.2 percent of monomeric acids. Soybean oil contains relatively small amounts of saturated acids such as palmitic, stearic, and arachidic. Additionally soybean oil fatty acids contain as unsaturated acids about 52.5 percent of linoleic acid, about 33.5 percent of oleic acid and about 2.3 percent of linolenic acid. Using the procedure as set forth in Example 7, the heating is continued until an acid number of 22 is reached. Thereupon the resin is cooled to about 190°C. and 110 parts of trimellitic anhydride are added. After holding at a temperature of about 180°-185°C. for 30 minutes, the resin is cooled to about 150°C. and then thinned with solvent as in Example 1 to about 75 percent solids. This resin solution is made into a baking enamel as was done in the Examples 1-6 inclusive and the resulting baking enamel performed in all essential respects equal to the enamels of Examples 1, 2 and 3.

I claim:

1. A hydrolytically stable alkyd resin which is capable of being rendered water dispersible comprising the esterification reaction product of
   a. a mixture of (1) from about 40 to 82 percent of at least one aromatic dicarboxylic acid; (2) from about 5% to 20 percent of at least one aromatic tricarboxylic acid; (3) from about 10 to 20 percent of an oligomer mixture of unsaturated long chain fatty acids; and (4) from about 0 to 20 percent of at least one aliphatic dicarboxylic acid, wherein said percentages of acids are by weight based on the total weight of said acids used and total 100 percent, and
   b. a mixture of (1) from about 90 to 50 percent of at least one hindered diol free of any carboxyl groups; (2) from about 0 to 25 percent of at least one hindered diol containing a tertiary carboxyl group; and (3) from about 0 to 25 percent of at least one unhindered diol or at least one polyhydric alcohol having at least three alcoholic hydroxy groups, wherein said percentages of diols and polyhydric alcohols are by weight based on the total weight of the alcohols used and total 100 percent.

2. An alkyd resin according to claim 1 in which the hindered diol compound containing a tertiary carboxyl group is 2,2-bis(hydroxymethyl) propionic acid.

3. An alkyd resin according to claim 2 in which the hindered diol compound free of any carboxyl groups is neopentyl glycol.

4. An alkyd resin according to claim 2 in which the aromatic dicarboxylic acid is isophthalic acid.

5. An alkyd resin according to claim 1 in which the aromatic dicarboxylic acid is isophthalic acid.

6. An alkyd resin according to claim 1 in which the hindered diol compound free of any carboxyl groups is neopentyl glycol.

7. An alkyd resin according to claim 6 in which the aromatic dicarboxylic acid is isophthalic acid.

8. An alkyd resin according to claim 1 in which the aromatic tricarboxylic acid is trimellitic acid.

9. An alkyd resin according to claim 2 in which the aromatic tricarboxylic acid is trimellitic acid.

10. An alkyd resin according to claim 3 in which the aromatic tricarboxylic acid is trimellitic acid.

* * * * *

UNITED STATES PATENT OFFICE
CERTIFICATE OF CORRECTION

Patent No. 3,893,959  Dated July 8, 1975

Inventor(s) Ralph Earl Layman

It is certified that error appears in the above-identified patent and that said Letters Patent are hereby corrected as shown below:

IN THE TITLE, delete "ALKYL" and substitute therefor -- ALKYD --

Col. 8, line 62, insert -- not -- after "should".

Col. 9, line 31, delete "$Z_6-2_7$" and insert therefor -- $Z_6-Z_7$ -- .

Signed and Sealed this twenty-fifth Day of November 1975

[SEAL]

Attest:

RUTH C. MASON
Attesting Officer

C. MARSHALL DANN
Commissioner of Patents and Trademarks